United States Patent
Garcia Sedano et al.

(10) Patent No.: US 10,510,016 B2
(45) Date of Patent: Dec. 17, 2019

(54) METHODS AND SYSTEMS USING A COMPOSITION OF AUTONOMOUS SELF-LEARNING SOFTWARE COMPONENTS FOR PERFORMING COMPLEX REAL TIME DATA-PROCESSING TASKS

(71) Applicant: OPTIMITIVE S.L.U., Vitoria-Gasteiz (ES)

(72) Inventors: Javier Angel Garcia Sedano, Vitoria Gasteiz (ES); Eneko Arbizu Castaniza, Laudio (ES)

(73) Assignee: OPTIMITIVE S.L.U. (ES)

( * ) Notice: Subject to any disclaimer, the term of this patent is extended or adjusted under 35 U.S.C. 154(b) by 504 days.

(21) Appl. No.: 14/543,293

(22) Filed: Nov. 17, 2014

(65) Prior Publication Data
US 2016/0140452 A1    May 19, 2016

(51) Int. Cl.
 *G06N 20/00*    (2019.01)
 *G06N 5/04*    (2006.01)
 *G06N 5/02*    (2006.01)

(52) U.S. Cl.
 CPC .............. *G06N 20/00* (2019.01); *G06N 5/022* (2013.01); *G06N 5/04* (2013.01)

(58) Field of Classification Search
 CPC .......... G06N 20/00; G06N 5/022; G06N 5/04; G06N 99/005; G06N 7/00
 See application file for complete search history.

(56) References Cited

U.S. PATENT DOCUMENTS

| | | | | |
|---|---|---|---|---|
| 6,937,966 | B1* | 8/2005 | Hellerstein | G06Q 10/06 703/2 |
| 8,380,642 | B2* | 2/2013 | Stundner | G06N 20/00 706/12 |
| 2007/0294201 | A1* | 12/2007 | Nelken | G06F 16/20 706/60 |
| 2008/0134043 | A1* | 6/2008 | Georgis | H04N 7/10 715/733 |
| 2009/0204267 | A1* | 8/2009 | Sustaeta | G05B 13/0285 700/291 |
| 2009/0254499 | A1* | 10/2009 | Deyo | G06Q 10/10 706/12 |

(Continued)

FOREIGN PATENT DOCUMENTS

KR    2009-0024865 A    3/2009

OTHER PUBLICATIONS

The Machine Learning Toolbox Consultant—1994 Graner et al.*
(Continued)

*Primary Examiner* — Eric Nilsson
*Assistant Examiner* — Ababacar Seck
(74) *Attorney, Agent, or Firm* — Foley Hoag LLP; Rajesh Vallabh

(57) ABSTRACT

A composition of autonomous self-learning skill software components interact with one another to solve a real time complex task. Each software component includes a knowledge base and an inference algorithm that uses the knowledge base to solve a given data-processing task involving input data. Each software component may also include a machine learning algorithm for training the knowledge base with new data in real-time as the new data is received.

22 Claims, 4 Drawing Sheets

(56) References Cited

U.S. PATENT DOCUMENTS

| | | | | |
|---|---|---|---|---|
| 2010/0138368 A1* | 6/2010 | Stundner | G06N 20/00 | 706/12 |
| 2012/0095734 A1* | 4/2012 | Moll | G06Q 10/06 | 703/2 |
| 2012/0209798 A1* | 8/2012 | Kaushal | G05B 13/0265 | 706/13 |
| 2013/0232331 A1* | 9/2013 | Farhan | G06F 11/3006 | 713/100 |
| 2013/0282641 A1* | 10/2013 | Martin | G06N 5/02 | 706/47 |
| 2013/0304455 A1* | 11/2013 | O'Sullivan | G06F 17/241 | 704/9 |
| 2015/0200955 A1* | 7/2015 | Martin | G06F 21/562 | 726/23 |

OTHER PUBLICATIONS

The Machine Learning Toolbox Consultant—1994 Graner et al.. (Year: 1994).*

Abe et al., "Constructive Meta-learning with Machine Learning Method Repositories," Apr. 21, 2004 (Apr. 21, 2004), Innovations in Applied Artificial Intelligence; [Lecture Notes in Computer Science;Lecture Votes in Artificial Intelligence; LNCS], Springer-Verlag, Berlin/Heidelberg, pp. 502-511, XP019005285, ISBN: 978-3-540-22007-7, p. 502-p. 510.

Bernstein et al., "Toward Intelligent Assistance for a Data Mining Process: An Ontology-Based Approach for Cost-Sensitive Classification," IEEE Transactions on Knowledge and Data Engineering, IEEE Service Center, Los Alamitos, CA, US, vol. 17, No. 4, Apr. 1, 2005 (Apr. 1, 2005), pp. 503-518, XP011127515, ISSN: 1041-4347, DOI: 10.1109/TKDE.2005.67, p. 503 -p. 517, left-hand column, paragraph 3.

Graner et al., "The Machine Learning Toolbox Consultant," International Journal of Artificial Intelligence Tools, vol. 02, No. 03, Sep. 1, 1993 (Sep. 1, 1993), pp. 307-328, XP055256280, SG ISSN: 0218-2130, DOI: 10.1142/S0218213093000163, p. 1-p. 21, paragraph 3.

Maggo et al., "A Machine Learning based Efficient Software Reusability Prediction Model for Java Based Object Oriented Software," International Journal of Information Technology and Computer Science, vol. 6, No. 2, Jan. 8, 2014 (Jan. 8, 2014), pp. 1-13, XP055255548, ISSN: 2074-9007, DOI: 10.5815/ijitcs.2014.02.01, p. 1-p. 11, last paragraph.

Vilalta et al., "Using Meta-Learning to Support Data Mining," International Journal of Computer Science & Applications, Jan. 1, 2004 (Jan. 1, 2004), pp. 31-45, XP055255522, Retrieved from the Internet: URL:http://www.tmrfindia.orgjijcsajV1I13.pdf [retrieved on Mar. 8, 2016] p. 31-p. 42.

Vukicevic et al., "Cloud Based Metalearning System for Predictive Modeling of Biomedical Data," The Scientific World Journal, vol. 2, No. 2, Apr. 14, 2014 (Apr. 14, 2014), pp. 1-10, XP055255531, ISSN: 2356-6140, DOI: 10.1109/TSC.2010.15, p. 1-p. 8, right-hand column, paragraph 1.

International Search Report and Written Opinion for PCT/IB2015/002188, dated Mar. 22, 2016.

Vilalta et al., "Using meta-learning to support data mining," International Journal of Computer Science & Applications, 31-45 (2004).

* cited by examiner

METHODS AND SYSTEMS USING A COMPOSITION OF AUTONOMOUS SELF-LEARNING SOFTWARE COMPONENTS FOR PERFORMING COMPLEX REAL TIME DATA-PROCESSING TASKS

BACKGROUND

The present application relates generally to computer data-processing and, more particularly, to methods and systems using a composition of autonomous self-learning software components for performing complex real time data-processing tasks.

BRIEF SUMMARY OF THE DISCLOSURE

A computer system in accordance with one or more embodiments includes at least one processor, memory associated with the at least one processor, and a program supported in the memory. The program contains a plurality of instructions executable by the at least one processor, comprising a composition of autonomous self-learning skill software components. Each software component includes a knowledge base and an inference algorithm that uses the knowledge base to solve a given data-processing task involving input data. Each software component also includes a machine learning algorithm for training the knowledge base with new data in real-time as the new data is received. The software components interact with one another to solve a complex task.

In accordance with one or more further embodiments, a computer program product is disclosed. The product resides on a non-transitory computer readable medium and includes a skill composition program containing a plurality of instructions executable by one or more computer processors. The program includes a plurality of autonomous self-learning skill software components. Each software component includes a knowledge base and an inference algorithm that uses the knowledge base to solve a given data-processing task involving input data. Each software component also includes a machine learning algorithm for training the knowledge base with new data in real-time as the new data is received, wherein the software components interact with one another to solve a complex task.

DETAILED DESCRIPTION

As described in further detail below, a Skill in accordance with one or more embodiments is an autonomous software component that is expert in solving a single data-processing task in a computer system. A set of Skills can be combined to solve more complex data-processing tasks in real-time. Each Skill has an inference algorithm that uses a knowledge base to carry out its task. The knowledge base can have a fixed implementation, or be self-learned automatically in each Skill, depending on its nature.

A set of Skills can be composed by defining the basic Skills (canonic Skills) involved in the resolution of a complex data-processing problem, and how they are coordinated in sequence to carry out the complex task. Skills are linked to specific dynamics (Macrostates) of the problem to solve.

Each basic Skill type (canonical Skill) is based on a specific knowledge representation paradigm and on an inference engine, able to reason and carry out a task based on that knowledge. Instances of each canonic Skill become specific task-purpose Skills which, in real-time, carry out their reasoning on the basis of their input data and their specific knowledge base, which is a specific implementation of knowledge accomplishing the knowledge representation paradigm of that canonic Skill.

Some Skills may have a fixed knowledge, implemented in accordance with a knowledge representation paradigm or in the form of mathematical equations. Other Skills are autonomous and self-learning. A self-learning Skill knows how to learn and evolve, selecting the appropriate data and transforming it and how to use its knowledge. It detects when it has to learn based on new process data. On the basis of past data of the problem adequately stored by the Skill, it has an inductive learning capability implemented in a machine learning algorithm, which means that its knowledge base is automatically populated and/or tuned to learn and adapt to carry out its task with real data of the problem.

Individual Skills are similar in general to classical self-learning Expert Systems. Each Skill includes a Knowledge Base, which is data used by an Artificial Intelligence inference algorithm to infer a result. The Knowledge Base can be predefined or can be dynamically learned from real-time data of the problem.

The knowledge representation paradigm can be any that allows carrying out a task by means of an adequate Inference Algorithm. By way of non-limiting example, the knowledge representation paradigm can be Rules, Fuzzy Rules, Bayesian Networks, Neural Networks, Neurofuzzy Networks, Support Vector Machines, statistical model equations, dynamic model equations, mathematical transformations, or source coded calculation routines in the Inference Algorithm.

Figure 1:
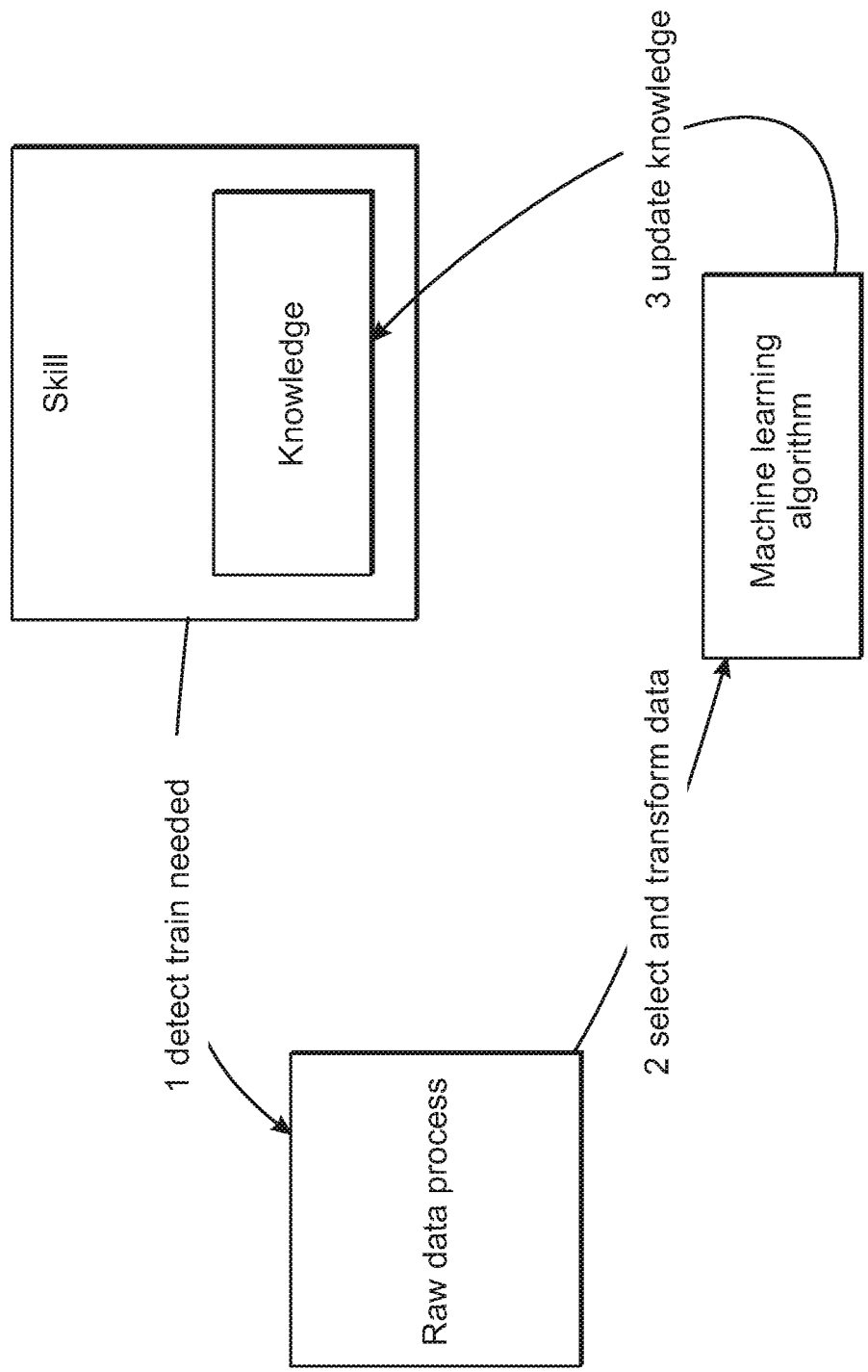
FIG. 1 is a simplified block diagram illustrating an exemplary learning process of a Skill in accordance with one or more embodiments.

Each Skill includes a machine Learning algorithm, which is an Artificial Intelligence or other algorithm that enables the Skill to learn from real-time data of the problem. It allows training the Knowledge Base of a Skill with new data in real-time. It knows which data it needs to learn from, using different criteria depending on the type of Skill. FIG. 1 schematically illustrates an exemplary learning process of a Skill in accordance with one or more embodiments.

Figure 2:
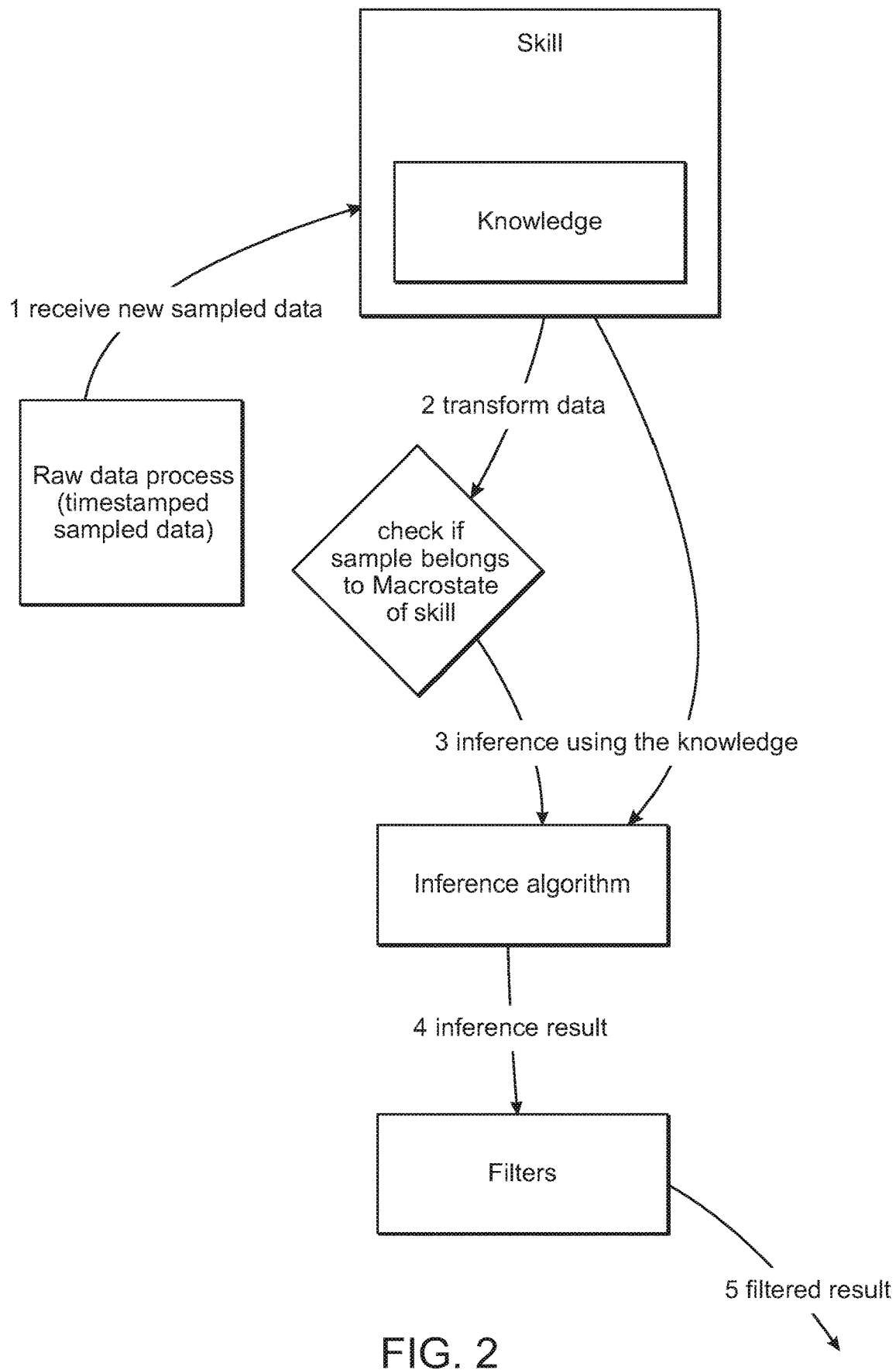
FIG. 2 is a simplified flow diagram illustrating an exemplary inference process of a Skill in accordance with one or more embodiments.

Each Skill also includes Artificial Intelligence or other kind of Inference Algorithm that uses the knowledge of the Skill to infer a new result for the current problem status. For example, the result of the inference can be a prediction, a recommendation, or new derived variables. FIG. 2 schematically illustrates an exemplary inference process of a Skill in accordance with one or more embodiments.

Each Skill further includes a specification of the conditions in which it is applicable. These are defined as fuzzy boundary conditions (upper and lower values) for those variables that determine the applicability of the Skill, and represent states of the problem in which the Skill might be used. Each of these specifications is also called a Macrostate. Skills know in which Macrostates (problem's states) they are applicable.

Filters are data-processing methods that can be applied to results of a Skill for safety and stability reasons. For example, a filter can verify that a value of a recommendation is always inside the allowed operating boundaries.

All basic Skills of a same type (instances of the same canonic Skill) share the same inference algorithm and (eventually) the same machine learning algorithm. These Skills have a different specific knowledge base, which corresponds to its canonical specific knowledge representation paradigm. Skills also have different specifications of the fuzzy subsets of states of the problem (specified by the boundary conditions) called Macrostates.

Each Skill knows which data it needs at the input of the inference and learning algorithm. It is able to transform the problem's raw data and results of another Skill into data understandable by the algorithms.

Skills know which data to provide as its outcome. The outcome result can be processed by one or several filters, which ensure the compliance of different safety or quality conditions. The following are non-limiting examples of different type of possible Skills: (1) Optimization Skill that provides a recommendation for the optimization, (2) Identification model Skill that is a model able to predict new values of variables under certain situations or hypothesis, (3) Diagnosis Skill that is able to identify causes of failures, (4) Failure prediction Skill that is able to predict possible failures or their likelihood, (5) Soft sensor Skill that is able to estimate hidden or error data on the basis of available data, (6) Composed model Skill whose outputs are obtained my means of several complementary models, and (7) Data-processing/Filtering Skills. The composing models have inputs that can be either inputs of the composed model or outputs from composing models. Composing models also include outputs that can be either outputs of the composed model, or inputs to other composing models.

The composition of Skills allows the inference of Skills sequentially and in parallel in order to carry out more complex real-time tasks, such as, e.g., optimization, prediction, diagnosis, planning, estimation, soft-sensoring, and classification, among others.

Skills, their properties, their knowledge, and their composition can be dynamically modified and instantiated by means of XML configuration files.

By way of example, a Skill composition is implemented in the OPTIBAT® software product and technology for the Real-time optimization and overall improvement of the operation of industrial and energy intensive processes, available from OPTIMITIVE.

Non-Limiting Example of a Skill Composition

For the optimization of a key performance indicator (KPI) of a problem, the Skill composition is able to propose recommendations for two setpoints: Setpoint1 and Setpoint2. A prediction is provided of what will be the KPI value in case of applying the recommendation. For the prediction of the KPI, another variable (VarX2) is needed. It is not obtained from the problem. It is calculated with a mathematical function from other variable (VarX1).

The optimization Skill is only usable when VarX2 value is higher than 10. Lower values are considered a not usual or unknown situation, because they do not belong to the optimization skill Macrostate.

Figure 3:
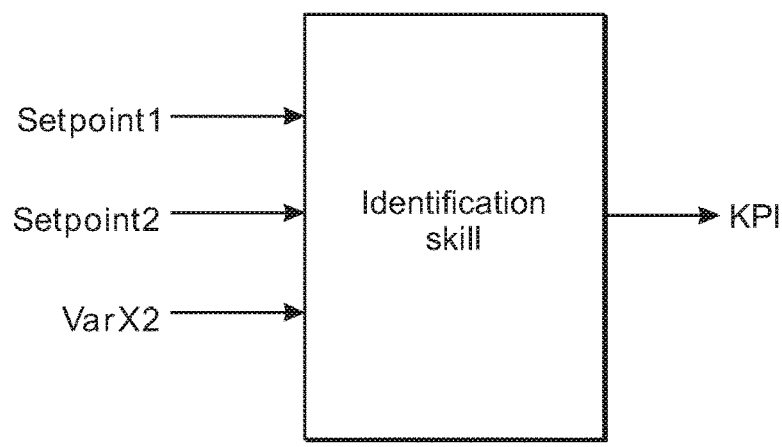
FIG. 3 is a simplified block diagram illustrating operation of an exemplary Identification Skill in accordance with one or more embodiments.
Figure 4:
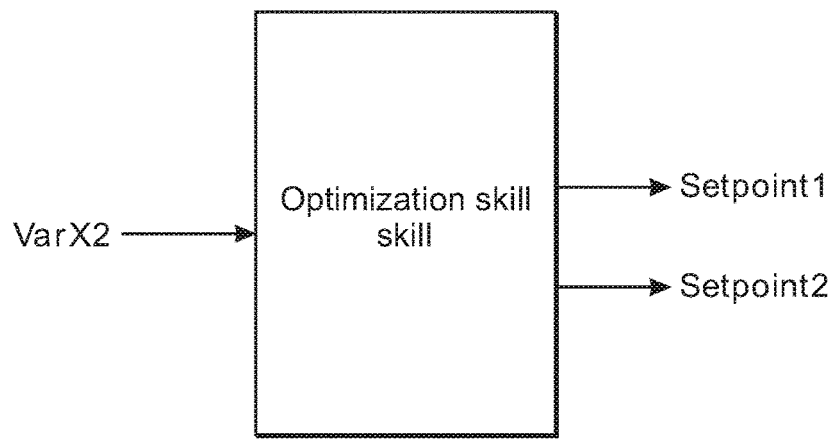
FIG. 4 is a simplified block diagram illustrating operation of an exemplary Optimization Skill in accordance with one or more embodiments.
Figure 5:
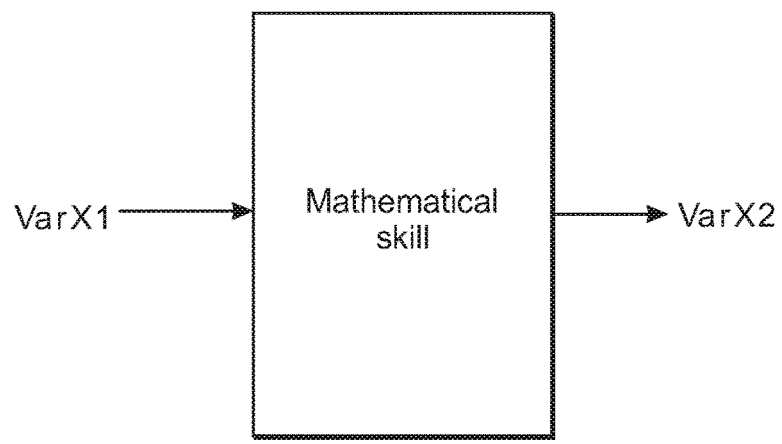
FIG. 5 is a simplified block diagram illustrating operation of an exemplary Mathematical Skill in accordance with one or more embodiments.

The Skills needed for this task are an Identification Skill (shown in FIG. 3), an Optimization Skill (shown in FIG. 4), and a Mathematical Skill (shown in FIG. 5). The Identification Skill is able to predict the KPI, based on an Artificial Neural Network. The Optimization Skill is able to propose optimized setpoints for Setpoint1 and Setpoint2 values, based on an optimization algorithm. The Mathematical Skill is able to calculate VarX2 using VarX1.

Figure 6:
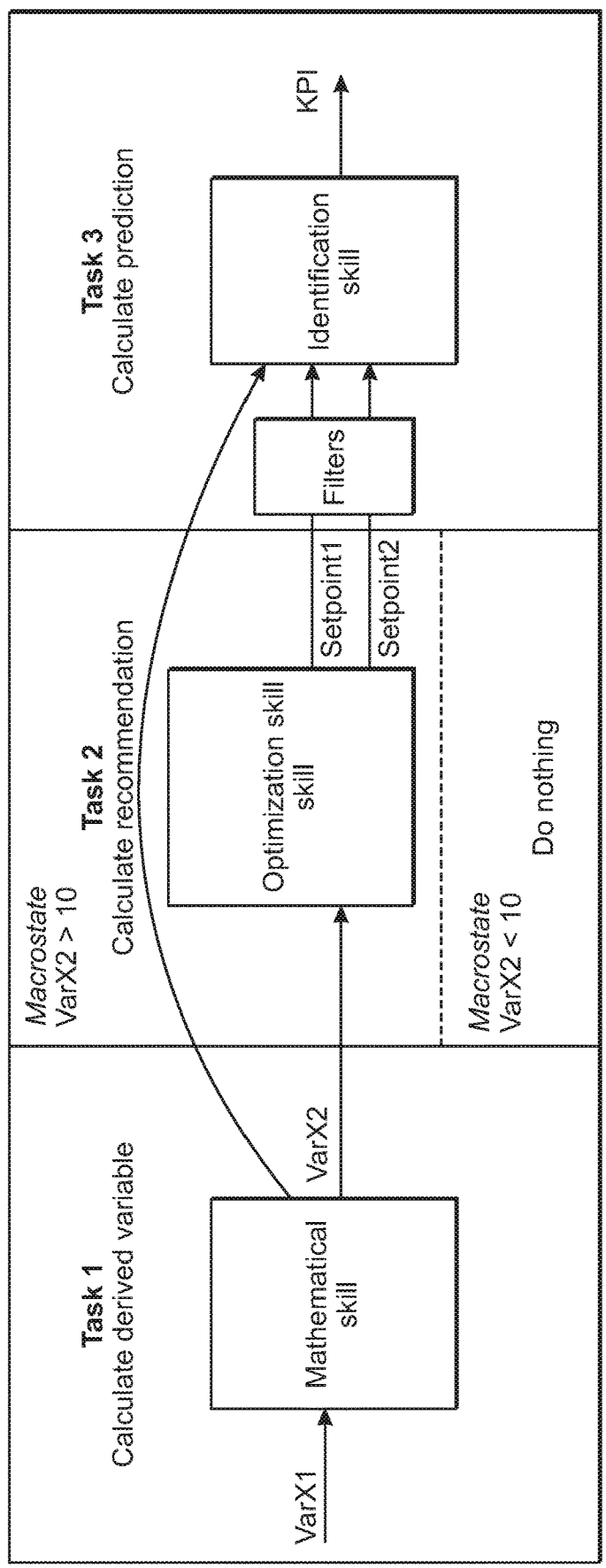
FIG. 6 is a simplified block diagram illustrating operation of an exemplary Skill composition in accordance with one or more embodiments.

The Skills are combined as shown in FIG. 6 in three steps (tasks), which are executed for each sample of data obtained.

In Task1, the mathematical Skill calculates value for VarX2 using VarX1.

In Task2, the optimization Skill is used only if VarX2 value is higher than 10. It searches for optimum values for Setpoint1 and Setpoint2. These setpoints are processed by filters, to verify that values are inside defined boundaries. The result of this operation will be the recommendation.

In Task3, the recommendation is evaluated by an Identification Skill. This Skill will provide a prediction of the KPI if the recommended setpoints are applied.

As a result, with the execution of the three tasks, recommendation and prediction are obtained.

The processes of the Skills composition system described above may be implemented in software, hardware, firmware, or any combination thereof. The processes are preferably implemented in one or more computer programs executing on a programmable computer system including a processor, a storage medium readable by the processor (including, e.g., volatile and non-volatile memory and/or storage elements), and input and output devices. Each computer program can be a set of instructions (program code) in a code module resident in the random access memory of the computer system. Until required by the computer system, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network.

Accordingly, the foregoing description and attached drawings are by way of example only, and are not intended to be limiting.

What is claimed is:

1. A computer system for generating optimization recommendations, comprising:
at least one processor;
memory associated with the at least one processor; and
a program supported in the memory, the program containing a plurality of instructions executable by the at least one processor, comprising a structured and predefined composition of autonomous self-learning skill software components for solving a complex task, each software component including a knowledge base and an inference algorithm that uses the knowledge base to perform a given data-processing task involving input data or a result of a data-processing task performed by another software component or both the input data and the result of the data processing task performed by another software component, each software component also including a machine learning algorithm for training the knowledge base with new data in real-time as the new data is received, and each software component being capable of selecting new data for training the knowledge base and transforming the new data into a format useable by the software component for training the knowledge base, wherein the software components interact with one another sequentially or in parallel or both sequentially and in parallel to solve a task more complex than any task performable by any one of said software components, and wherein at least one of said software components performs a given data-processing task involving a result of a data-processing task performed by another software component, and wherein at least one of the software components comprises an optimization skill that generates an optimization recommendation to be output by the system, said optimization recommendation comprising an actionable recommendation specifying one or more setpoints for a physical process, and wherein at least one of the software components comprises an identification model skill that receives and assesses the optimization recommendation from the optimization skill to predict one or more new values of variables under a given situation or hypothesis based on the one or more setpoints, wherein the variables include a key performance indicator (KPI).

2. The system of claim 1, wherein the inference algorithm is an artificial intelligence algorithm.

3. The system of claim 1, wherein the knowledge base comprises rules, fuzzy rules, Bayesian networks, neural networks, neurofuzzy networks, support vector machines, statistical model equations, dynamic model equations, mathematical transformations, or source code calculation routines.

4. The system of claim 1, wherein the machine learning algorithm is an artificial intelligence algorithm.

5. The system of claim 1, wherein the machine learning algorithm includes an inductive learning capability.

6. The system of claim 1, wherein each software component includes a specification of problem states for which it is applicable.

7. The system of claim 1, wherein each software component filters the results of a data-processing task.

8. The system of claim 7, wherein the results are filtered to verify that they are within allowed operating boundaries.

9. The system of claim 1, wherein software components of the same type share the same inference algorithm and the same or different machine learning algorithm.

10. The system of claim 9, wherein the software components of the same type have different knowledge bases or different specifications of states of the problem.

11. The system of claim 1, wherein at least one of the software components comprises a diagnosis skill that identifies causes of failures, a failure prediction skill that predicts possible failures or their likelihood, a soft sensor skill that estimates hidden or error data based on available data, a composed model skill that generates outputs based on multiple complementary models, or a filtering skill.

12. A computer program product for generating optimization recommendations residing on a non-transitory computer readable medium including a skill composition program containing a plurality of instructions executable by one or more computer processors, comprising:
a structured and predefined composition of autonomous self-learning skill software components for solving a complex task, each software component including a knowledge base and an inference algorithm that uses the knowledge base to perform a given data-processing task involving input data or a result of a data-processing task performed by another software component or both the input data and the result of the data processing task performed by another software component, each software component also including a machine learning algorithm for training the knowledge base with new data in real-time as the new data is received, and each software component being capable of selecting new data for training the knowledge base and transforming the new data into a format useable by the software component for training the knowledge base, wherein the software components interact with one another sequentially or in parallel or both sequentially and in parallel to solve a task more complex than any task performable by any one of said software components, and wherein at least one of said software components performs a given data-processing task involving a result of a data-processing task performed by another software component, and wherein at least one of the software components comprises an optimization skill that generates an optimization recommendation to be output by the system, said optimization recommendation comprising an actionable recommendation specifying one or more setpoints for a physical process, and wherein at least one of the software components comprises an identification model skill that receives and assesses the optimization recommendation from the optimization skill to predict one or more new values of variables under a given situation or hypothesis based on the one or more setpoints, wherein the variables include a key performance indicator (KPI).

13. The computer program product of claim 12, wherein the inference algorithm is an artificial intelligence algorithm.

14. The computer program product of claim 12, wherein the knowledge base comprises rules, fuzzy rules, Bayesian networks, neural networks, neurofuzzy networks, support vector machines, statistical model equations, dynamic model equations, mathematical transformations, or source code calculation routines.

15. The computer program product of claim 12, wherein the machine learning algorithm is an artificial intelligence algorithm.

16. The computer program product of claim 12, wherein the machine learning algorithm includes an inductive learning capability.

17. The computer program product of claim 12, wherein each software component includes a specification of states of the problem for which it is applicable.

18. The computer program product of claim 12, wherein each software component filters the results of a data-processing task.

19. The computer program product of claim 18, wherein the results are filtered to verify that they are within allowed operating boundaries.

20. The computer program product of claim 12, wherein software components of the same type share the same inference algorithm and the same or different machine learning algorithm.

21. The computer program product of claim 20, wherein the software components of the same type have different knowledge bases or different specifications of states of the problem.

22. The computer program product of claim 12, wherein at least one of the software components comprises a diagnosis skill that identifies causes of failures, a failure prediction skill that predicts possible failures or their likelihood, a soft sensor skill that estimates hidden or error data based on available data, a composed model skill that generates outputs based on multiple complementary models, or a filtering skill.

\* \* \* \* \*